Figure 1:
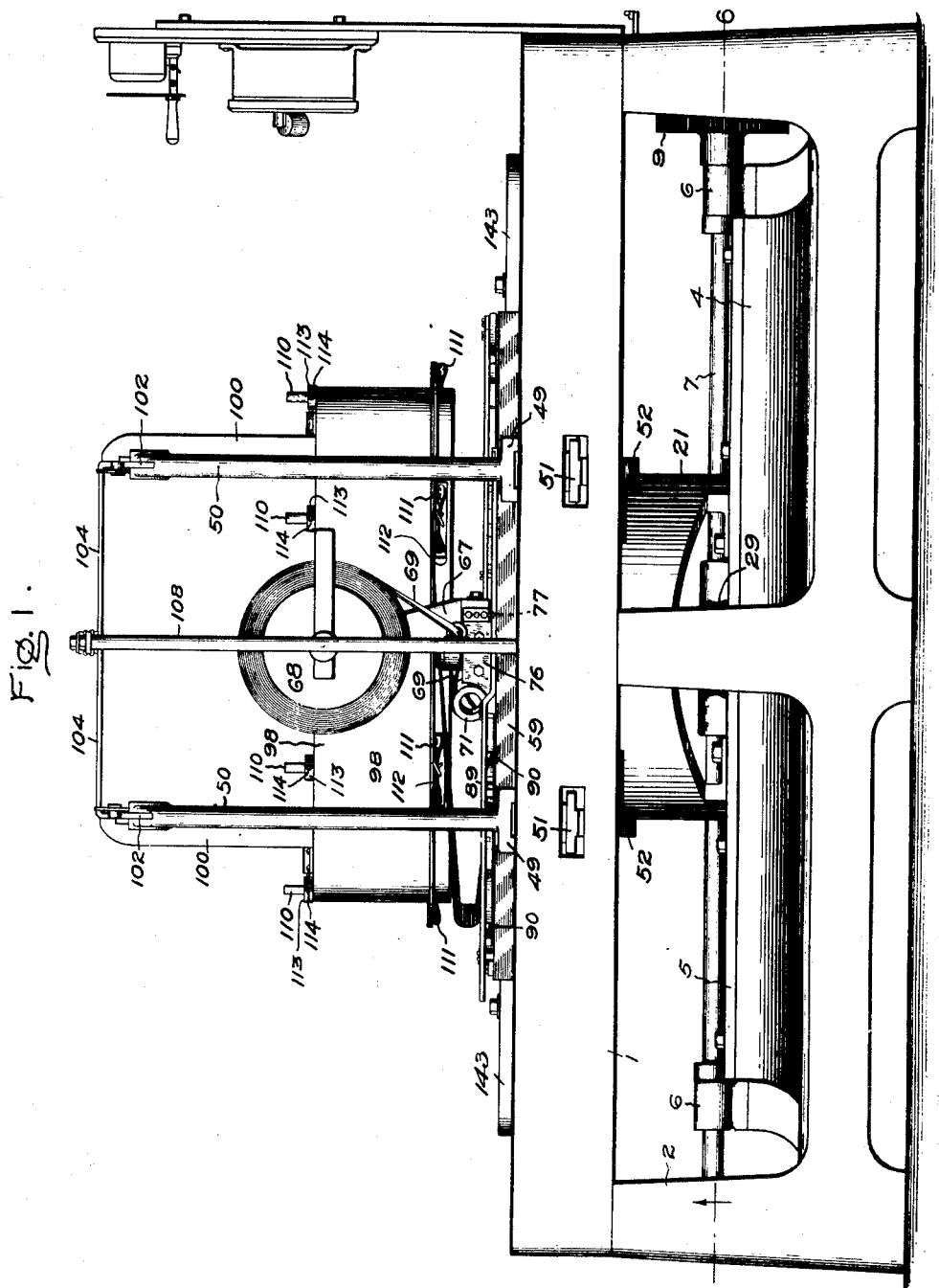

H. G. SAHLIN.
COIL WINDING MACHINE.
APPLICATION FILED APR. 19, 1907.

1,025,835.

Patented May 7, 1912.

12 SHEETS—SHEET 1.

Witnesses:
Marcus L. Byng.
J. Ellis Glen

Inventor,
Henning G. Sahlin,
By Albert G. Davis
Atty.

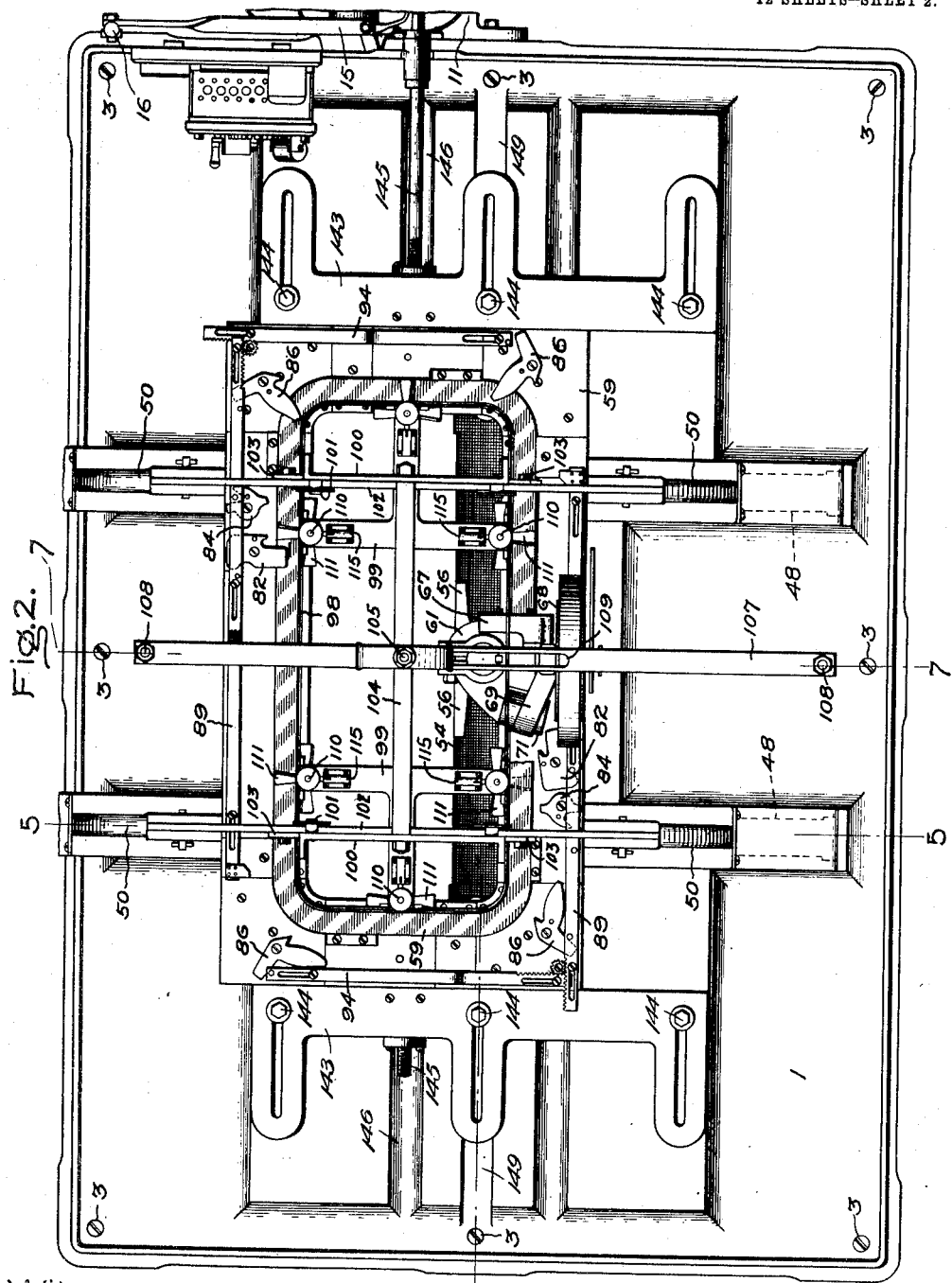

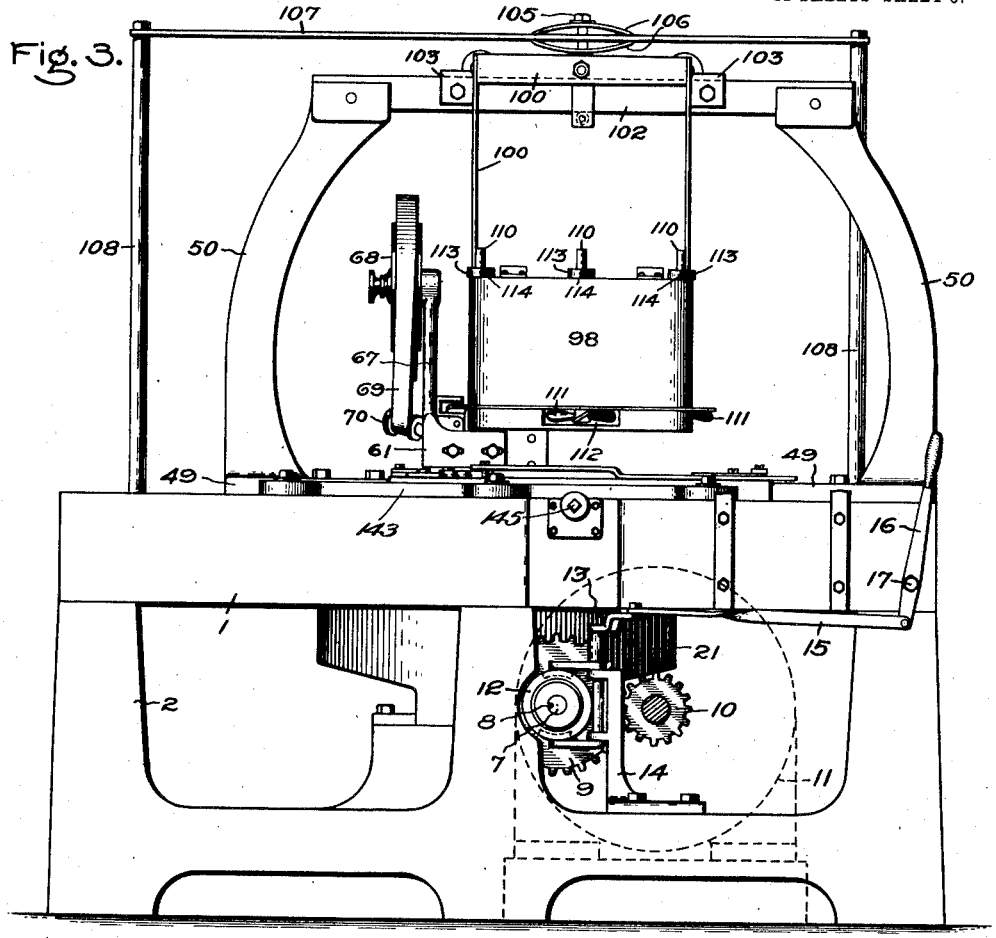
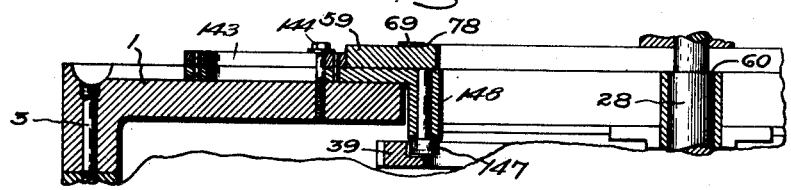
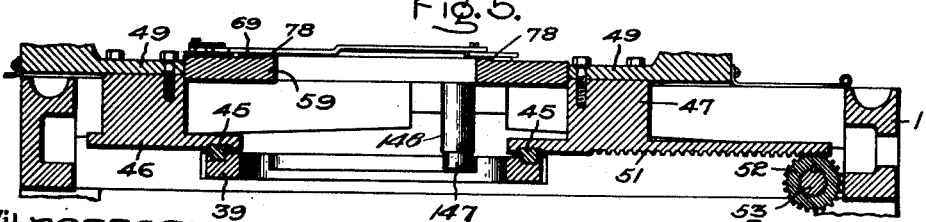

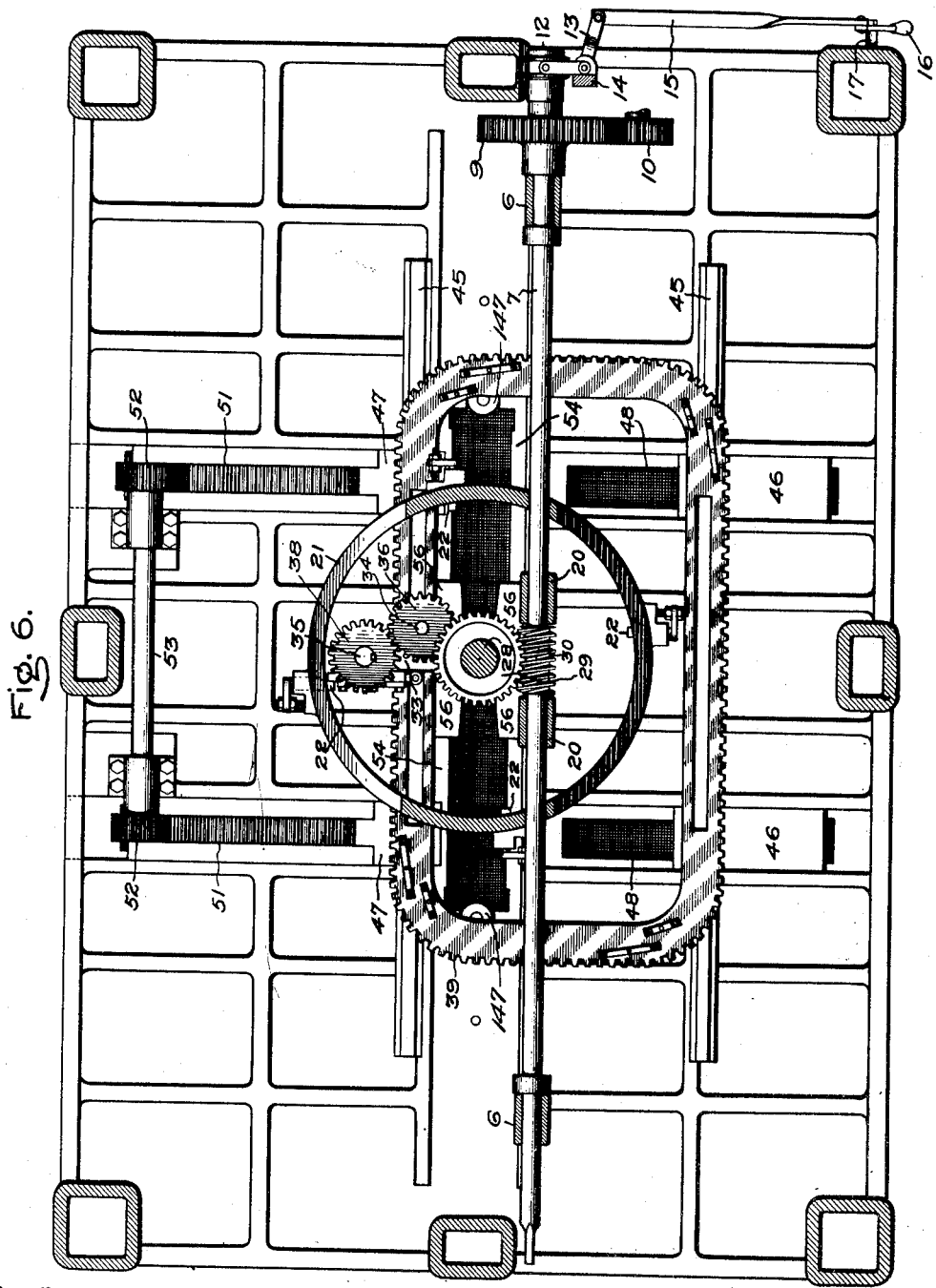

Witnesses:
Marcus L. Byng.
J. Ellis Glen

Inventor,
Henning G. Sahlin,
By Albert G. Davis
Att'y.

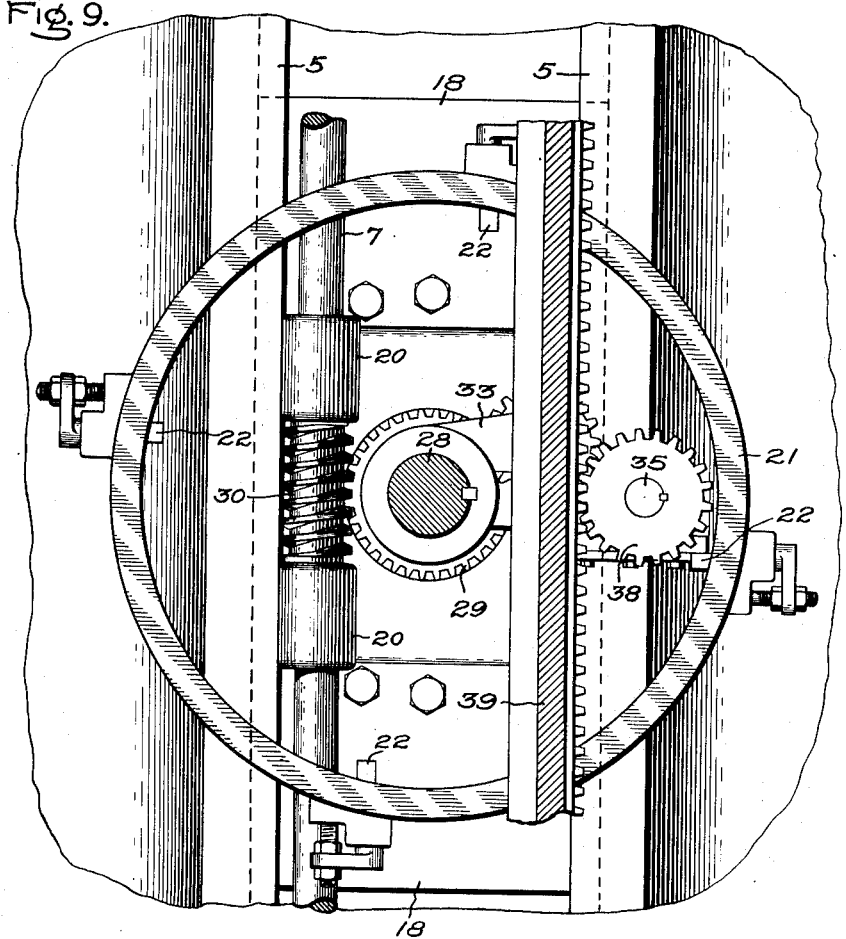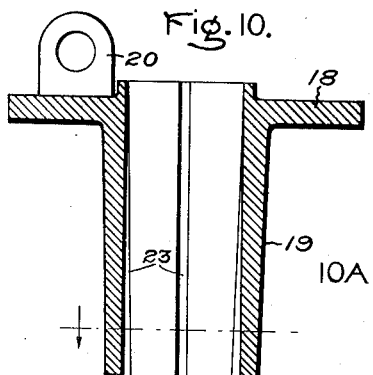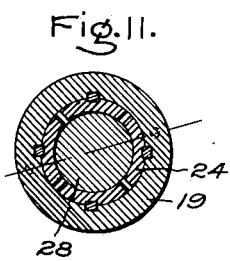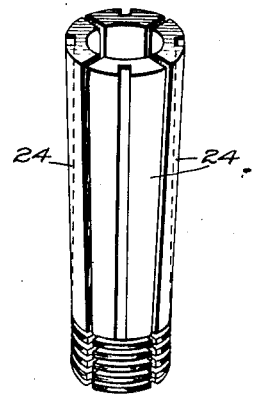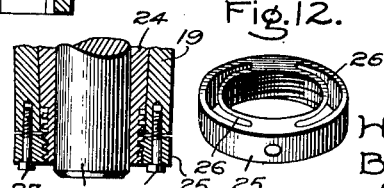

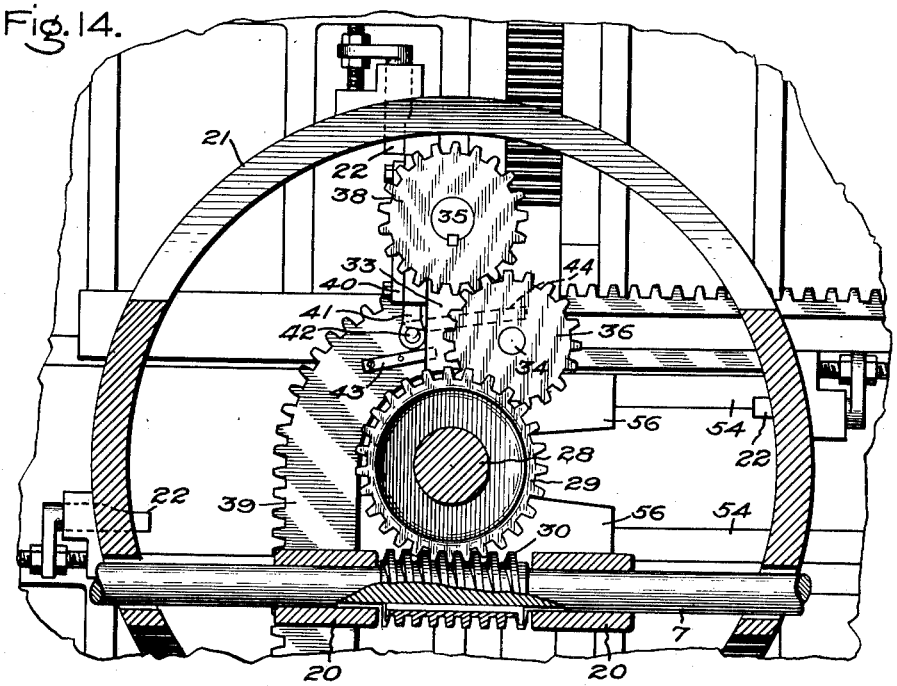
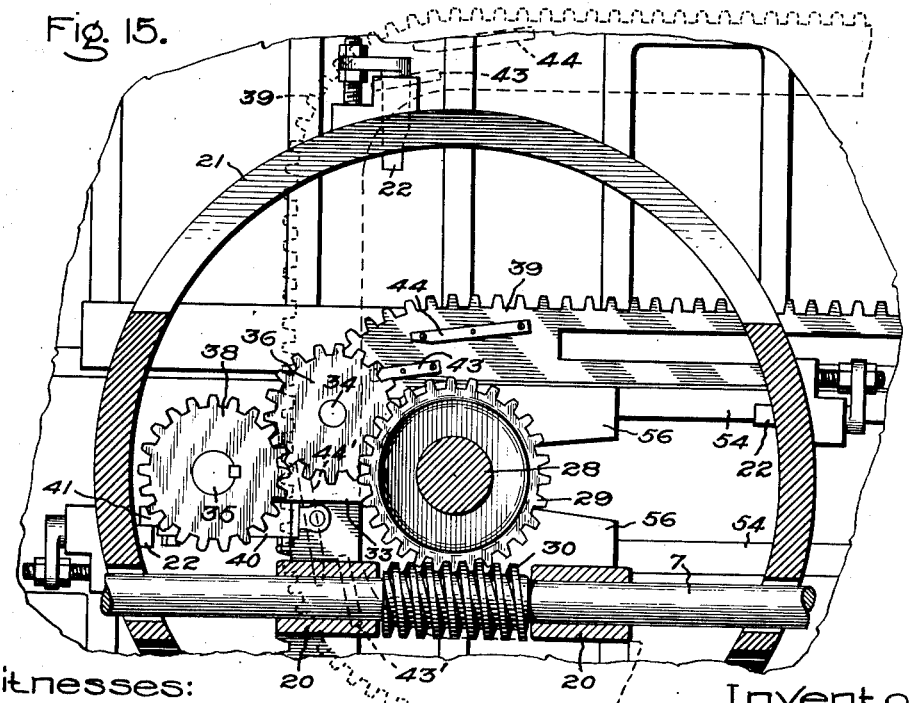

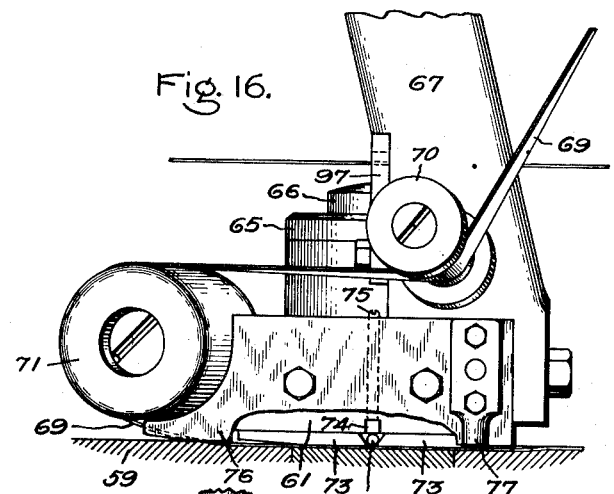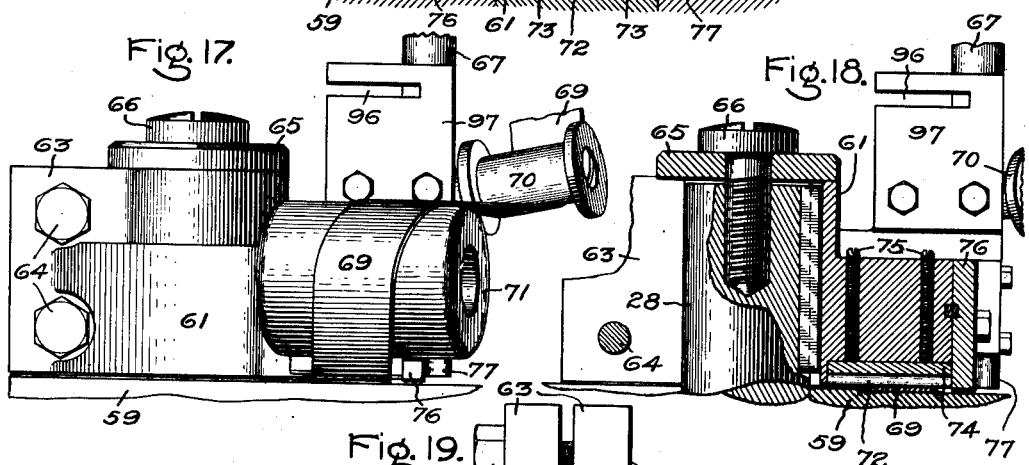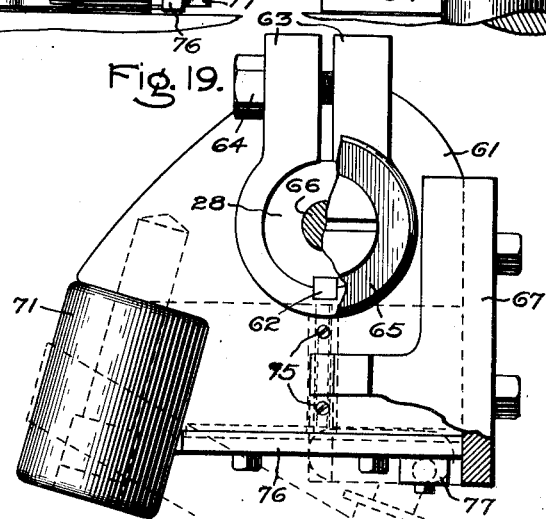

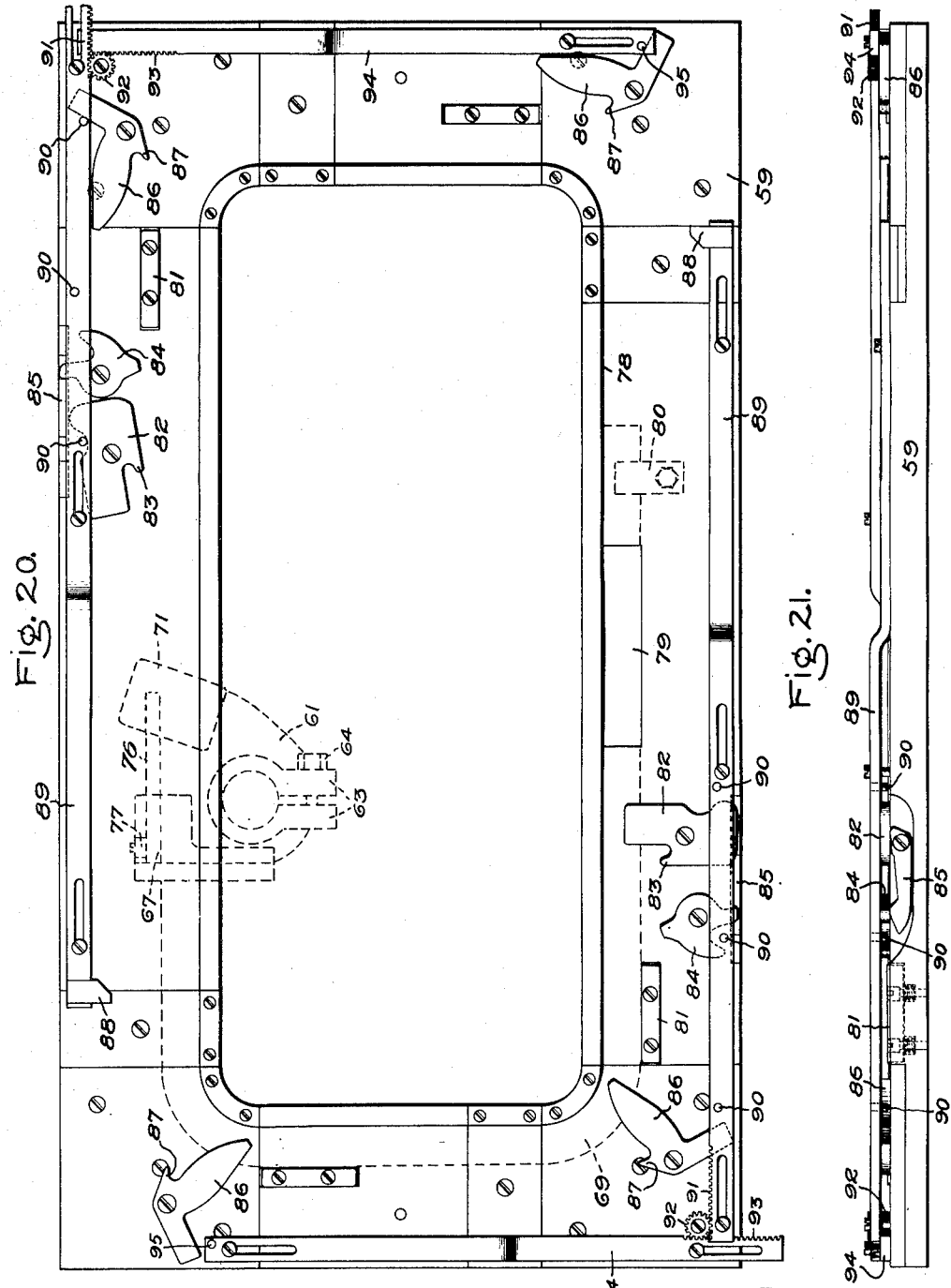
H. G. SAHLIN.
COIL WINDING MACHINE.
APPLICATION FILED APR. 19, 1907.
1,025,835.
Patented May 7, 1912.
12 SHEETS—SHEET 9.
Witnesses:
Marcus L. Byng.
J. Ellis Glen
Inventor,
Henning G. Sahlin,
By Albert H. Davis
Att'y.

H. G. SAHLIN.
COIL WINDING MACHINE.
APPLICATION FILED APR. 19, 1907.

1,025,835.

Patented May 7, 1912.
12 SHEETS—SHEET 10.

Witnesses:
Marcus L. Byng.
J. Ellis Glen

Inventor,
Henning G. Sahlin,
By Albert G. Davis
Att'y.

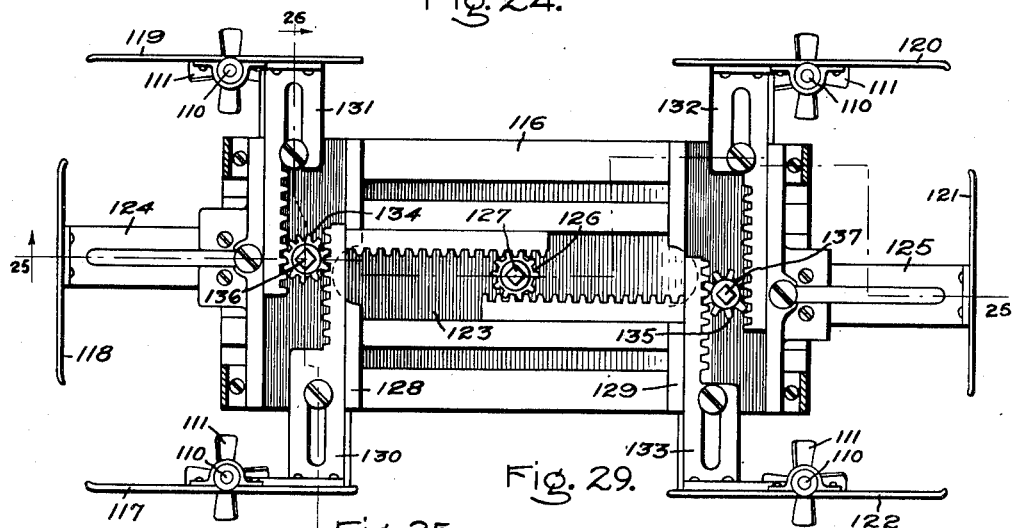
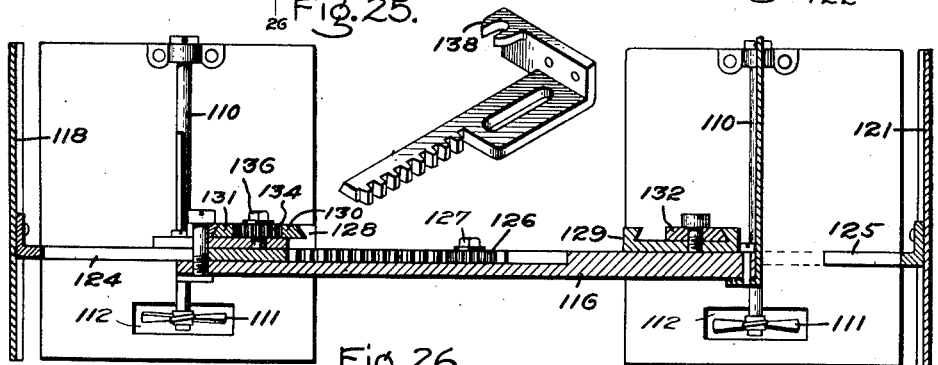
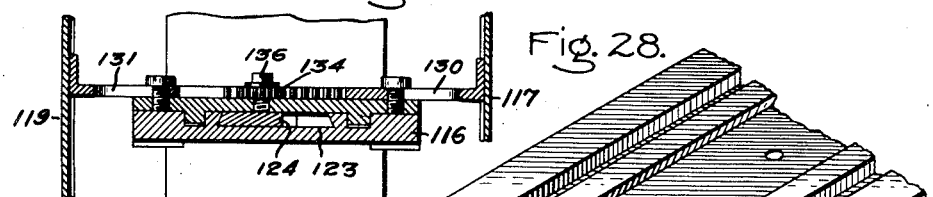
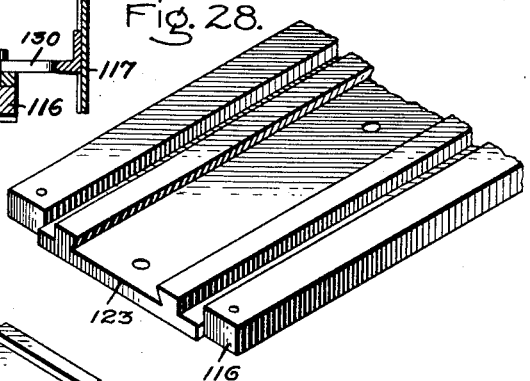
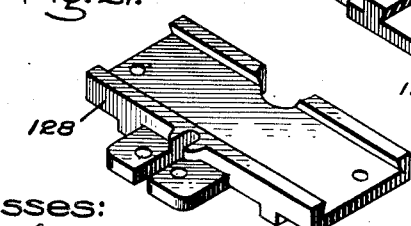

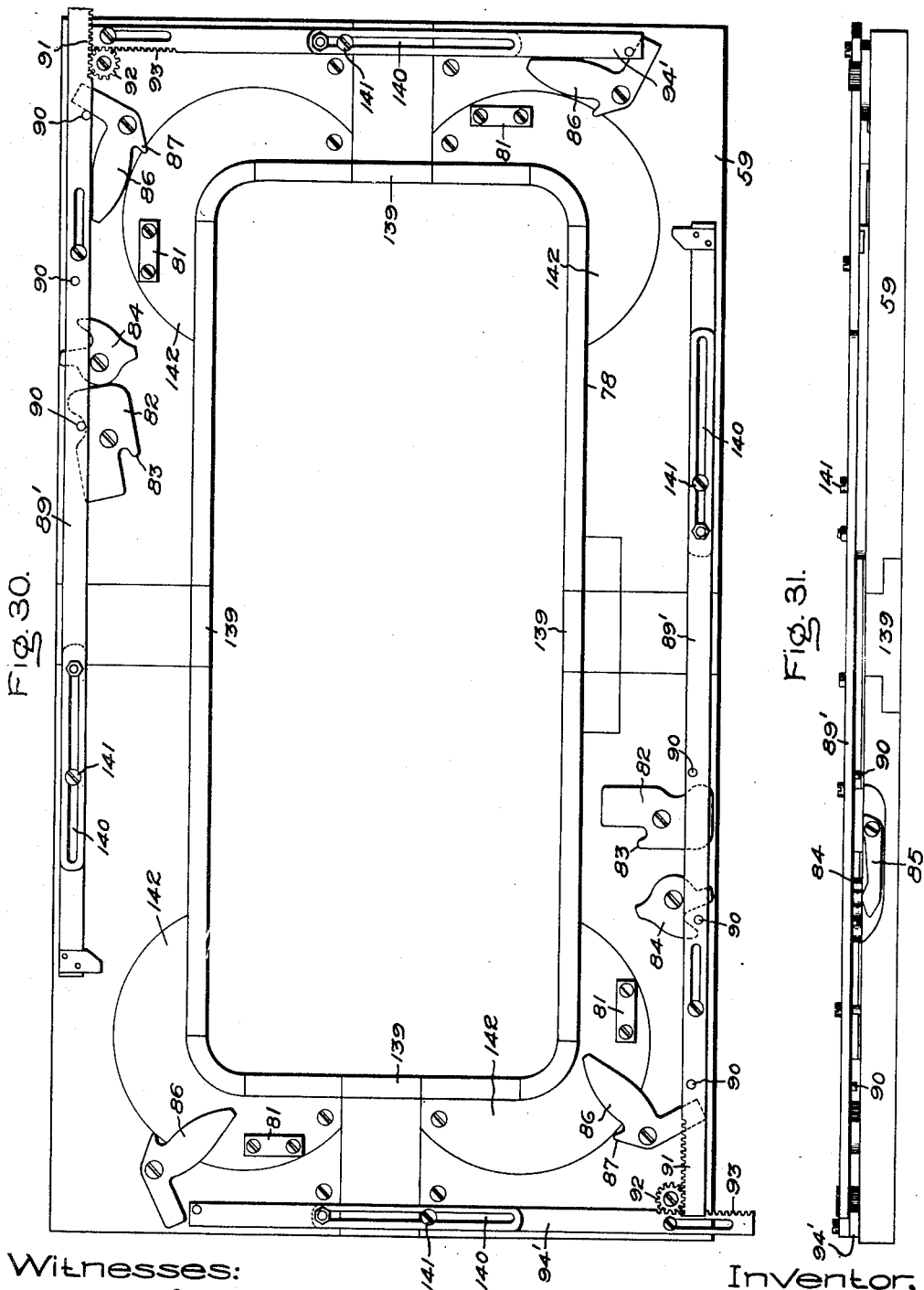

UNITED STATES PATENT OFFICE.

HENNING G. SAHLIN, OF MAPLEWOOD, MASSACHUSETTS, ASSIGNOR TO GENERAL ELECTRIC COMPANY, A CORPORATION OF NEW YORK.

COIL-WINDING MACHINE.

1,025,835.   Specification of Letters Patent.   Patented May 7, 1912.

Application filed April 19, 1907. Serial No. 369,112.

*To all whom it may concern:*

Be it known that I, HENNING G. SAHLIN, a citizen of the United States, residing at Maplewood, county of Middlesex, State of Massachusetts, have invented certain new and useful Improvements in Coil-Winding Machines, of which the following is a specification.

The present invention relates to the art of metal working and more particularly to the manufacture of edge-wound coils, or coils made by bending edgewise strips or ribbons of metal into desired forms for use as windings of field poles of dynamo-electric machines and similar apparatus. The metal ribbons employed for this purpose are usually of copper or other relatively soft metal and have a thickness which is only a small fraction or a few per cent. of the width. Much trouble has been experienced in the manufacture of coils of this type on account of the tendency of the ribbons to buckle during the bending operation. Moreover, it has been impossible heretofore to prevent the bent portions from assuming wedge-shaped cross sections on account of the upsetting of the metal at the inner edge of the curve and the reduction or drawing at the outer edge. The formation of the wedge-shaped cross sections at the bent portions of edge-wound coils is highly objectionable since the total length of the completed coil is increased in proportion as such upsetting affects the thickness of each convolution, and in the present day dynamo-electric machines compactness of parts is of the highest desideratum.

The object of my invention is to provide a machine for making edge-wound coils which will effectually prevent upsetting and buckling of the bent portions of the strips from which the coils are made.

In carrying out my invention I provide a form of a shape and size corresponding to the coil to be produced, a winding head upon which the metal ribbon is carried and provided with an ironing or compressing device adapted to flatten the ribbon against the form, and means for moving the head in a longitudinal path to lay the ribbon along a side portion of the form and then effect an angular movement of the head through ninety degrees to lay the ribbon about a corner portion; the laying of the ribbon along the end portion of the form is effected by a transverse movement of the latter and the corner turned by a second angular movement of the head through ninety degrees whereupon the head is brought into position to return by a longitudinal movement to lay the ribbon along the opposite side portion. Means are provided for temporarily holding portions of a single convolution in contact with the form and for subsequently removing it therefrom in advance of the next traverse of the head so that only the last formed convolution means in contact with the form. A coil support is provided in proximity to the form to receive the several convolutions as they are completed.

For a more complete understanding of the invention, reference should be had to the accompanying drawings forming a part of this specification, in which—

Figure 7:
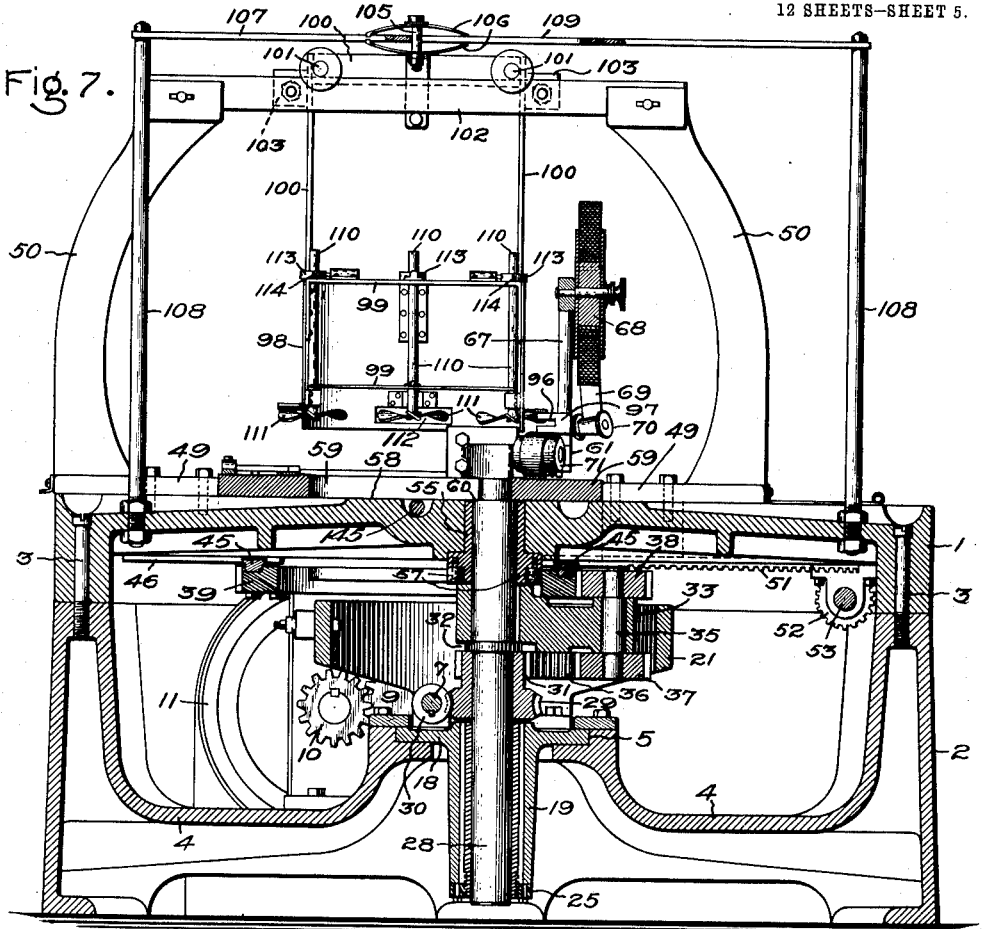
Figure 8:
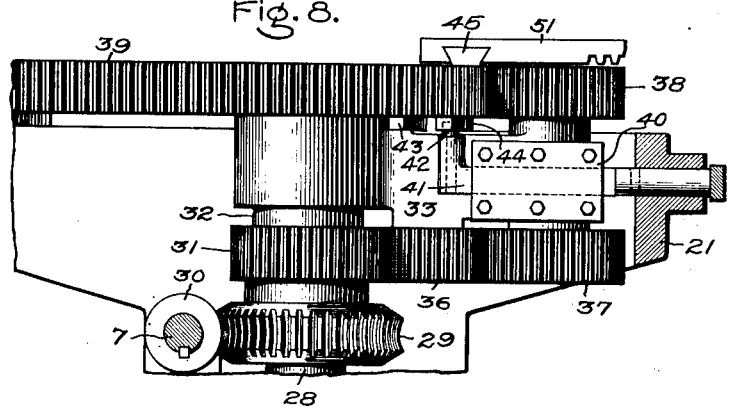
Figure 22:
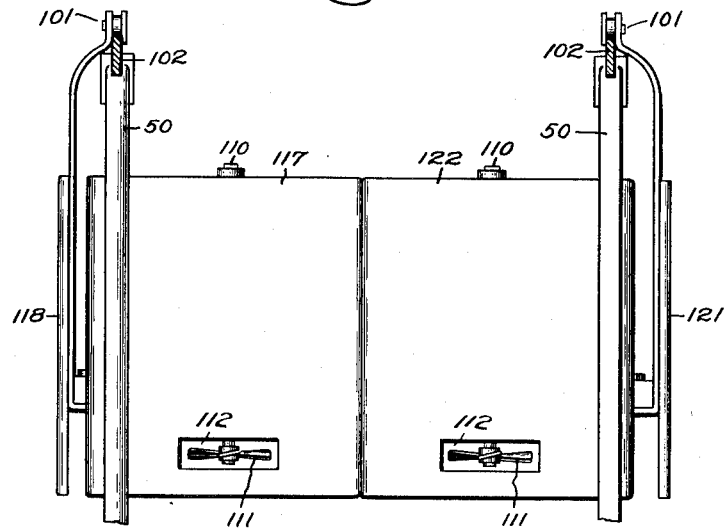
Figure 23:
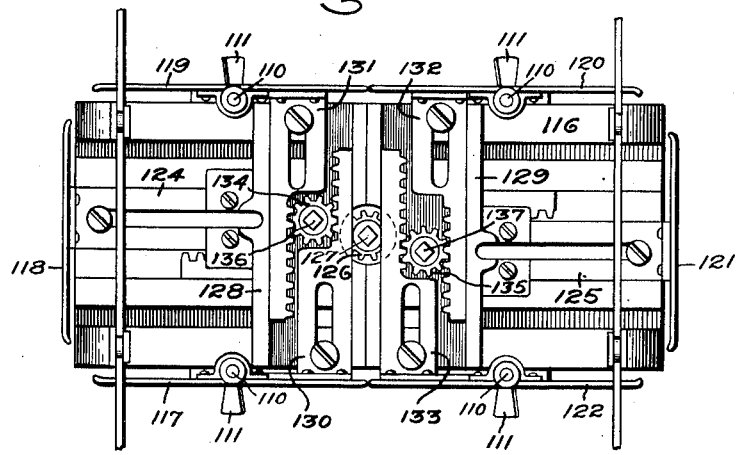

Figure 1 is a front elevation of a winding machine embodying one form of my invention; Fig. 2 is a top plan view; Fig. 3 is a right end elevation with the driving motor and controlling rheostat removed; Fig. 4 is a fragmental longitudinal section of the main bed piece taken on line 4—4 of Fig. 2; Fig. 5 is a fragmental cross section of the same taken on line 5—5 of Fig. 2; Fig. 6 is an inverted plan section taken on line 6—6 of Fig. 1; Fig. 7 is a central transverse section of the complete machine taken on line 7—7 of Fig. 2; Fig. 8 is a side elevation of the planetary gears and locking means shown at the center of Fig. 7; Fig. 9 is a top plan of the same; Figs. 10, 10A, 11, 12, and 13 are detail views of the lower bearing of the vertical shaft; Figs. 14 and 15 are inverted fragmentary plan views of the planetary gears, locking means and coil form; Figs. 16, 17, 18 and 19 are detail views of the winding head; Figs. 20 and 21 are plan and side elevation respectively of the winding form and the devices for holding the ribbon in contact therewith; Figs. 22 and 23 are side elevation and plan respectively of the adjustable coil receiver; Fig. 24 is a plan of the same in expanded position; Fig. 25 is a longitudinal vertical section taken on line 25—25 of Fig. 24; Fig. 26 is a fragmentary cross section taken on line 26—26 of Fig. 24; Figs. 27, 28 and 29 are perspective views showing details of construction; and Figs. 30 and 31 are respectively plan and side elevation of a universally adjustable winding form.

The main frame of the machine comprises a rectangular table 1 supported on a pedestal 2 to which it is secured at each corner and centrally at each side and end by set screws 3. Extending from opposite sides of the lower portion of the pedestal 2 are webs 4 provided at their inner edges with guide ways 5 which extend nearly the full length of the machine and at the ends of the rear guide way 5 are bearings 6 for the main drive shaft 7 having a feather slot 8 extending its entire length and provided at the right-hand end with a loose gear 9 which meshes with a pinion 10 of the motor 11. The gear 9 is coupled to its shaft by a clutch 12 (see Fig. 6) of ordinary construction and actuated by a bell crank 13 pivoted upon a bracket 14 and connected by a link 15 to a hand lever 16 fulcrumed upon a stud 17 projecting from the end of the table 1. (See Fig. 3.)

In the guide ways 5 is mounted a freely movable rectangular slide 18 having at its center a depending bearing block 19 (see Figs. 9 to 13), and on its upper surface two integral bearings 20 for the drive shaft 7 and a drum 21 bolted thereto and carrying four equally spaced adjustable stops 22. The bearing block 19 has a downwardly tapering bore and four vertical guide ways 23 to which are keyed adjustable bearing segments 24 provided at the lower end with screw threads for the reception of a threaded ring 25 having segmental slots 26 for the passage therethrough of clamping screws 27.

In the bearing formed by the segments 24 is journaled a vertical shaft 28 on which is a loose worm wheel 29 which receives its motion from a worm 30 feathered loosely to the drive shaft 7 and disposed between the bearings 20 on the slide 18 so that it is caused to travel longitudinally of the shaft as the slide moves on its guide ways 5. The hub of the worm wheel 29 extends upwardly therefrom and is provided with an integral spur gear 31. Above the gear 31 the shaft 28 is provided with a fixed shoulder 32 and above the shoulder is splined a radial arm 33 in which are journaled two shafts 34 and 35, the former carrying at its lower end a spur gear 36 in mesh with gear 31 and the latter with a fixed spur gear 37, 38 at each end. Gear 37 is in mesh with gear 36 and gear 38 meshes with a rectangular rack 39. The radial arm 33 has a guide box 40 (see Fig. 8) bolted to one of its vertical sides in which is a radially movable lock bolt 41 with its outer end arranged to engage the respective stops 22 in the drum 21 and its inner end bent upwardly and provided with a finger 42 projecting into the path of cam plates 43, 44 and 43', 44' (see Figs. 14 and 15) secured to the under side of the rectangular rack 39 near its respective corners so that as the radial arm moves along a side of the rack and approaches a corner thereof, the bolt will be retracted sufficiently to release it from the stop 22 with which it is in engagement for the time being, thereby releasing the arm 33 and permitting it to swing through an angle of 90° as the gear 38 travels around the corner of the rack 39 whereat it is arrested by the succeeding stop 22. As the slide 18 and the parts carried thereby can move only back and forth in a fixed path, it is necessary that the rack 39 shall move transversely while the gear 38 traverses its end. The rack 39 is accordingly supported to permit of transverse movement, as shown in Figs. 5 and 6, by securing to its upper surface dovetailed projections 45 which enter corresponding recesses cut in the under surfaces of pairs of blocks 46 and 47 which extend upwardly through guide slots 48 cut in the table 1 and are secured to the feet 49 of arms 50, which bear upon the upper surface of the table and support the coil receiver. The blocks 47 at the front side of the machine are provided with horizontally projecting rack bars 51 which mesh with pinions 52 fixed to the opposite ends of a shaft 53 journaled near the front edge of the table; the object of which is to insure the simultaneous movement of both ends of the rack 39 and coil supports transversely of the machine.

The table 1 is longitudinally slotted at its center to form guide ways 54 for the reception of a bearing block 55 for the shaft 28. The block is provided with guide wings 56 extending in opposite directions therefrom to afford a long bearing engagement with the guide ways 54, and at the lower end of the block are friction rollers 57 (see Fig. 7) adapted to bear against the inner surface of the rectangular rack 39.

The upper side of the table 1 is machined off to form a plane bearing surface 58 upon which is disposed a flat coil form 59 made in sections and abutting at opposite edges against the feet 49 of the coil supporting arms 50 so that it is caused to move transversely of the table concurrently with the transverse movement of the rectangular rack 39. The upper end of the vertical shaft 28 is turned down to form a shoulder 60 adapted to underride the lower surface of the coil form 59 and has secured to its upper end a winding head 61, as shown in Figs. 16 to 19. The head 61 is prevented from turning on the shaft by a key 62, and is held in adjusted position relative to the upper surface of the coil frame 59 by a split lug 63 with clamping screws 64 and an end plate 65 held in position by a screw 66 tapped into the end of the shaft 28. To the rear edge of the head 61 is bolted a vertical bracket 67 adapted to support at its upper end a spool 68 carrying the metal ribbon 69. The ribbon 69 is led beneath a flanged guide roll 70 journaled near the lower end of the bracket 67, over and under a delivery roll 71 journaled at the front or leading edge of the head 61 and then passes between the lower surface of the head and the upper surface of the coil form 59. At the center of the head is a radial ironing roll 72 supported between the beveled ends of chafe plates 73 and bearing against a friction bar 74 adapted to be vertically adjusted by screws 75 tapped into the head 61. On the outer edge of the head is secured a guide plate 76 which operates on the edge of the metal ribbon 69 to prevent it from slipping from beneath the head, and near the rear end of the guide plate 76 is secured a depending trip finger 77.

The coil form 59, as shown in Figs. 20 and 21, has near its inner edge a shoulder 78 against which the inner edge of the ribbon 69 is laid, and alongside a short section of the front portion a recess 79 is cut in the upper surface of the frame 59 to permit the end of the ribbon to be passed with facility under the winding head 61 which, at starting of the coil, will be at rest at that point. A clamping plate 80 will be temporarily secured to the frame 59 over the end of the ribbon indicated by dotted line, Fig. 20, until half of the first convolution has been formed when it is removed entirely until another coil is to be started. At the approach to each corner of the frame 59 are spring-pressed blocks 81 seated in recesses, adapted to be depressed by the guide plate 76 and to rise automatically after the passage thereof to engage the outer edge of the ribbon 69 and hold it from springing outwardly as the bending operation about the corner of the form takes place. Near each block 81, at the front and rear sides of the frame, is pivoted a lever 82 having a catch projection 83 adapted to be engaged by the trip finger 77 on the winding head shortly before the latter reaches the corner of the frame so as to be rotated into a position at right angles to the side of the frame with its inner end overlying the ribbon 69 in contact with the frame. After the trip finger 77 has thrown a lever 82, it engages a cam 84 also pivoted to the frame and having an end projecting toward the outer edge thereof which, upon movement of the cam 84, engages the beveled end of an arm 85 pivoted, as shown in Fig. 21, to the edge of the frame 59 forcing it down and causing the opposite end to raise the outer end of lever 82 to thereby press the inner end of the latter upon the ribbon located between it and the form. At each corner of the frame 59 is pivoted an angular lever 86 having a projection 87 adapted to be engaged by the finger 77 as the winding head passes about the corner so as to be swung into clamping relation with the ribbon 69. As the winding head 61 completes the fourth corner upon its first circuit of the frame, the guide plate 76 engages at its leading end with a projection 88 so as to effect a longitudinal movement of a long releasing slide 89 secured to the upper surface of the frame 59 and provided with pins 90 adapted to engage levers 82 and 86 and cam 84 and restore them to inoperative positions. At the end of the slide opposite from the projection 88 a rack 91 is provided which engages a gear 92 mounted on the upper surface of the frame 59 and meshing with a second rack 93 on a short releasing slide 94 at the end of the frame which carries a pin 95 which acts upon the angle lever 86 near the left-hand rear corner of the frame. The temporary holding plate 80 is removed and the end of the ribbon 69 passed through a guide slot 96 formed in a plate 97 bolted to the winding head, as shown in Figs. 1, 7 and 16. As the head continues its travel, the ribbon is caused to slide freely through the slot 96 and is thereby picked up out of contact with the frame 59 so that the succeeding convolution may be placed, bent, ironed and clamped in immediate contact with the form as was the first convolution. The means for supporting the formed convolutions will be described later. As the head completes the left-hand rear corner of the second convolution, the guide plate 76 engages a second projection 88 and operates through a second set of slides 89 and 94 to release the holding levers and cam from engagement with the second half of the preceding convolution.

The coil receiver, as shown in Figs. 1, 2, 3 and 7, consists of a parallel-sided box 98 of sheet metal shaped to correspond with the inner surface of the coil and strengthened by T-shaped bars 99 at top and bottom, and near each end is secured a U-shaped suspension yoke 100 which extends upwardly and has at its top end hooks or projections 101 which catch over horizontal beams 102 carried in the upper ends of the arms 50. The beams 102 are provided with detachable projections 103 adapted to engage the frames 100 and prevent their movement on the beams as the latter are moved transversely of the machine with the transverse movement of the winding form 59. The upper ends of the yokes 100 may be connected by a cross bar 104 carrying at its center a vertical bolt 105 on which are mounted two leaf springs 106 bearing at their ends upon opposite sides of a stationary bar 107 carried on vertical posts 108 secured to the top of the table 1. The bar 107 is provided with a slot 109 in which the bolt 105 is free to move back and forth. The T-shaped cross bars are provided near each of their several ends with bearings in which are journaled vertical shafts 110 carrying at their lower ends four armed propellers 111 which extend through slots 112 cut in the lower walls of the box 98, and at the upper ends of the shafts are circular holding blocks 113 provided with peripheral recesses 114 at 90° apart which are engaged by spring-pressed bolts 115 mounted on the upper surface of the top cross bars whereby the shafts 110 and the propellers 111 are yieldingly held after each quarter turn thereof. The angular movement of the propellers 111 is effected by the engagement with the rear edges of the blades of the guide plate 97 carried by the head 61 so that as the latter passes each propeller, it is given a quarter turn, carrying the outwardly projecting arm thereof out of operative relation to the formed ribbon 69 and bringing the succeeding blade out into engagement with the ribbon as it issues from the guide slot 96 and raising it by the wedging action of the blade above the level of the upper edge of the guide plate 97, and at the same time raising the formed coil sufficiently to accommodate the last formed convolution.

I have shown in Figs. 22 to 29 a universal coil receiver comprising a main frame 116 and six extensible end and side portions 117, 118, 119, 120, 121 and 122. The frame 116 is provided with a longitudinal dovetail recess 123 in which are seated two rack bars 124 and 125 to the outer ends of which the end portions 118 and 121 are respectively attached and with their toothed portions engaging a pinion 126 journaled at the center of the frame 116 on a set screw 127 adapted to clamp the pinion 126 against the frame after the racks 124 and 125 have been moved into adjusted position. To the rack bars 124 and 125 are secured dovetailed cross plates 128 and 129 carrying pairs of rack bars 130, 131, 132 and 133 to the outer ends of which the side portions 117, 119, 120 and 122 are respectively connected and with their toothed portions engaging pinions 134 and 135 journaled upon clamping bolts 136 and 137. The outer ends of the cross rack bars are provided with bearing lugs 138, as shown in Fig. 29, for receiving the lower ends of the propeller shafts 110 in such manner that they may play inwardly and outwardly.

In Figs. 30 and 31, I have shown an adjustable winding form 59' made up of L-shaped corner sections and space blocks 139 connecting them. The releasing bars 89' and 94' are made in sections with slot 140 and screw 141 connections whereby they may be made longer or shorter according to the size of the frame. The corners of the frame may have hardened steel inset portions 142 to better resist the wear imposed thereon by the ironing action of the head 61 upon the metal ribbon at such points.

In order to adapt the machine to operate in conjunction with forms of less size than that shown in Figs. 1 to 5, the table 1 is provided with adjustable guides 143 normally held in fixed position by clamp screws 144 and adjustable by means of a reversely-threaded rod 145 lying in a longitudinal groove 146 in the table and provided with a squared end whereby it may be turned by a wrench. In order that the rack 39 may have lost motion endwise in proportion to the decrease in length of the winding form, adjustable stop rollers 147 are arranged to engage the inner surface thereof as shown in Figs. 4 and 5. These stop rollers 147 are carried on blocks 148 riveted to the adjustable guides 143 and slidable therewith in grooves 149 cut in the top of table 1.

I do not desire to restrict myself to the particular form or arrangement of parts herein shown and described, since it is apparent that they may be changed and modified without departing from my invention.

What I claim as new and desire to secure by Letters Patent of the United States, is,—

1. The combination in an edgewise winding machine, of a non-circular former of fixed shape, an anti-buckling bending guide, and means for automatically moving such guide so that the bending is all done at substantially the same part thereof.

2. In a machine for winding metallic strip or ribbon edgewise, a non-circular former, a guide for preventing buckling of the strip, and means for moving said guide both rectilinearly and curvilinearly.

3. The combination of means for bending a flat metal strip edgewise at definite intervals whereby a polygonal shaped coil is produced, and means operating concurrently with the bending operation to maintain uniformity of cross section throughout said strip.

4. The combination with a polygonal form, of means for laying a flat metal strip edgewise thereabout, and means for exerting pressure upon said strip in a line parallel to the face of said form and transverse to said strip.

5. The combination of a polygonal form, a winding head movable about said form and adapted to lay a flat metal strip edgewise thereabout, and means carried by said head for exerting pressure upon said strip in a line parallel to the face of said form and transverse to said strip.

6. The combination of a polygonal form, a winding head movable about said form and adapted to lay a flat metal strip edgewise thereabout, and a roller carried by said head and disposed radially to its axis.

7. The combination of a polygonal form, a winding head having ribbon supporting and guiding means, means for effecting the traverse of said head about said form, and an ironing roller carried by said head for maintaining uniformity of cross section in the bent ribbon.

8. The combination of a polygonal form, a winding head movable about said form and adapted to lay a flat metal strip edgewise thereabout, and means actuated by said head for holding said strip in place on the form.

9. The combination of a form, a winding head movable about said form and adapted to lay a flat metal strip edgewise thereabout, means actuated by said head for holding said strip in place, and means for automatically releasing said holding means.

10. The combination of a polygonal form, a winding head movable peripherally about said form and adapted to lay a flat metal strip edgewise thereabout, and automatic means for holding the strip in place at each corner.

11. The combination of a polygonal form, a winding head movable peripherally about said form and adapted to lay a flat metal strip thereabout, means for temporarily holding said strip in place, and means for removing said strip from the form in advance of the succeeding traverse of the head.

12. The combination of a polygonal form, a winding head movable peripherally about said form and adapted to lay a flat metal strip thereabout, means for temporarily holding said strip in place, means for removing said strip in advance of the succeeding traverse of the head, and means for supporting the formed coil.

13. The combination of a form, a winding head movable about said form and adapted to lay a flat metal strip edgewise thereabout, a coil receiver supported adjacent the form, and coil engaging devices carried by said receiver and actuated by said head.

14. The combination of a form, a winding head movable about said form and adapted to lay a flat metal strip thereabout, a coil receiver supported adjacent the form, and propeller blades journaled on said receiver in the path of said head and adapted to engage the formed coil.

15. The combination of a polygonal form, means for moving said form transversely, a winding head, and means for moving said head longitudinally of the form and angularly at each corner thereof.

16. The combination of a polygonal form, means for moving said form transversely, a winding head, means for moving said head longitudinally of the form and angularly at each corner thereof, and means for locking said head against angular movement upon the completion of its movement about a corner.

17. The combination of a rectangular form transversely movable, a rectangular rack connected to said form, a winding head movable axially and longitudinally, and a power driven planetary gear engaging said rack and journaled in a part rigidly connected to said head.

18. The combination of a table having longitudinal and transverse guide ways, a form supported thereon and engaged by blocks in said transverse guide ways, a winding head movable axially and lineally in said longitudinal slot, a rectangular rack carried by said guide blocks, and a power driven planetary gear engaging said rack and carried by a part rigidly connected to said head.

19. The combination of a table having longitudinal and transverse guide ways, a form supported thereon, a winding head movable axially and lineally in said longitudinal guide way, a rectangular rack having supporting blocks movable in said transverse guide ways and engaging said form, an arm rigidly connected to said head, a power driven planetary gear journaled on said arm, a bolt carried by said arm and adapted to engage stationary projections, and means carried by said rack for operating said bolt.

20. The combination of a table having longitudinal and transverse guide ways, a form supported thereon, adjustable stops for receiving forms of different sizes, a winding head movable axially and lineally in said longitudinal guide way, a rectangular rack engaging said adjustable stop and having supporting blocks movable in said transverse guide ways, and a power driven planetary gear engaging said rack and carried by a part rigidly connected to said winding head.

21. The combination of a rectangular form, means for moving said form transversely, a winding head, means for moving said head longitudinally of the form and angularly about the corners thereof, and a coil receiver supported in proximity to said form and movable therewith.

22. The combination of a table having thereon adjustable stops for receiving forms of different sizes, a winding head movable about said form, and an adjustable coil receiver supported in proximity to said form.

23. The combination in a winding machine of a non-circular former of fixed shape, a bending bar, and automatic means whereby said bending bar is constrained to so move that the part of the material which is being bent is always in substantially the same position relative thereto.

24. In an edgewise winding machine, a former, a movable frame carrying a supply of metallic strip to be wound, and an anti-buckling guide movable with said frame.

25. In an edgewise winding machine, a former, a movable frame carrying a supply of metallic strip to be wound, an anti-buckling guide movable with said frame, and means for causing said frame to so move that the bending surface of the guide is always at substantially the same distance from the periphery of the former.

26. In an edgewise winding machine, a former, a movable frame carrying a supply of metallic strip to be wound, and an anti-buckling guide and a tension device carried by said frame.

27. In an edgewise winding machine, a former, a movable frame carrying a supply of metallic strip to be wound, an anti-buckling guide and a tension device carried by said frame, and means for causing said frame to so move that the bending surface of the guide is always at substantially the same distance from the periphery of the former.

28. In a winding machine, a non-circular former, and a bending guide automatically movable both rectilinearly and curvilinearly so that it is always substantially at the place where the material is being bent.

29. In a coil winding machine, a former the periphery of which is composed of relatively fixed straight and curved parts, a bending guide, and means for so moving said guide that its bending surface is always at substantially the same distance from the periphery of the former as the curved parts of the coil are being formed and for moving it from one curved part of the former to another intermediately.

30. In a machine for winding metallic strip or ribbon edgewise, a former the periphery of which is composed of straight lines and arcs of circles, a guide for preventing buckling of the strip, and means for moving said guide curvilinearly as the strip is being bent around the curved part of the former and rectilinearly intermediately.

31. In a machine for winding metallic strip or ribbon edgewise, a former the periphery of which is composed of relatively fixed curved and straight parts, a guide for preventing buckling of the strip, and means for moving said guide so that it is always at the place of bending as the strip is being bent around the curved parts of the former and for moving it from one curved part to another intermediately.

32. An apparatus for winding edgewise a metallic strip or ribbon, which comprises a non-circular former provided with a guiding surface which is parallel with its periphery, a frame automatically movable relatively to said former, means mounted on said frame for preventing the strip from buckling, and a device on said frame engaging the guiding surface in said former.

33. In an edgewise winding machine, a member having a forming surface and a guiding surface parallel thereto, a movable member engaging said guiding surface, and means attached to said movable member for preventing buckling.

34. In an edgewise winding machine, a member having a forming surface and a guiding surface parallel thereto, a movable member engaging said guiding surface and carrying a supply of metallic strip to be wound, and means attached to said movable member for preventing buckling of the strip.

In witness whereof, I have hereunto set my hand this thirteenth day of April, 1907.

HENNING G. SAHLIN.

Witnesses:
JOHN A. McMANUS, Jr.,
FRANK G. HATTIE.